Dec. 26, 1922.
W. J. BEISEL.
SPRING WHEEL.
FILED DEC. 7, 1921.
1,440,128
3 SHEETS-SHEET 1
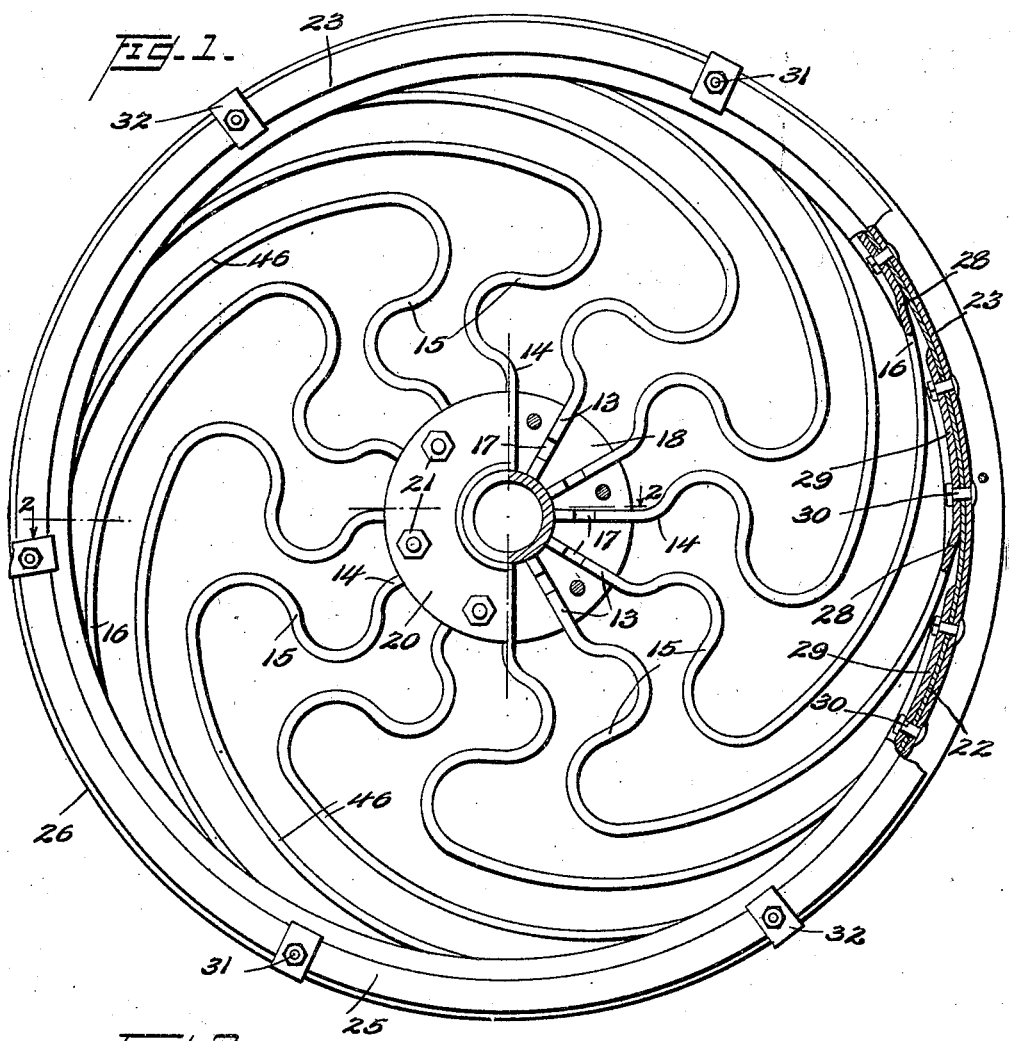
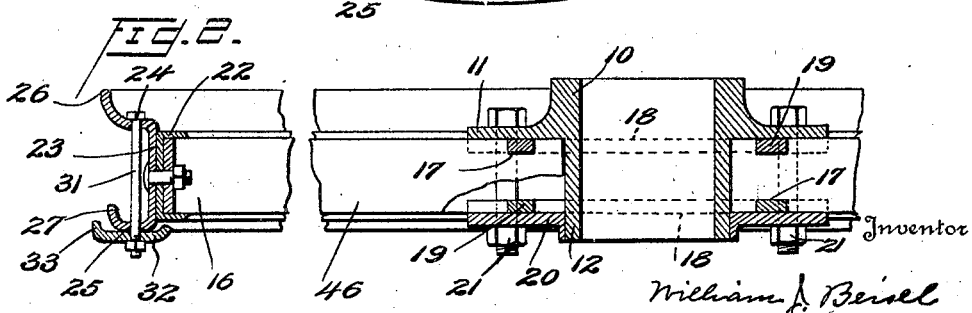
Inventor
William J. Beisel
By Walsem, Cort, Morse & Grindle
Attorneys Dec. 26, 1922.  1,440,128
W. J. BEISEL.
SPRING WHEEL.
FILED DEC. 7, 1921.
3 SHEETS-SHEET 2
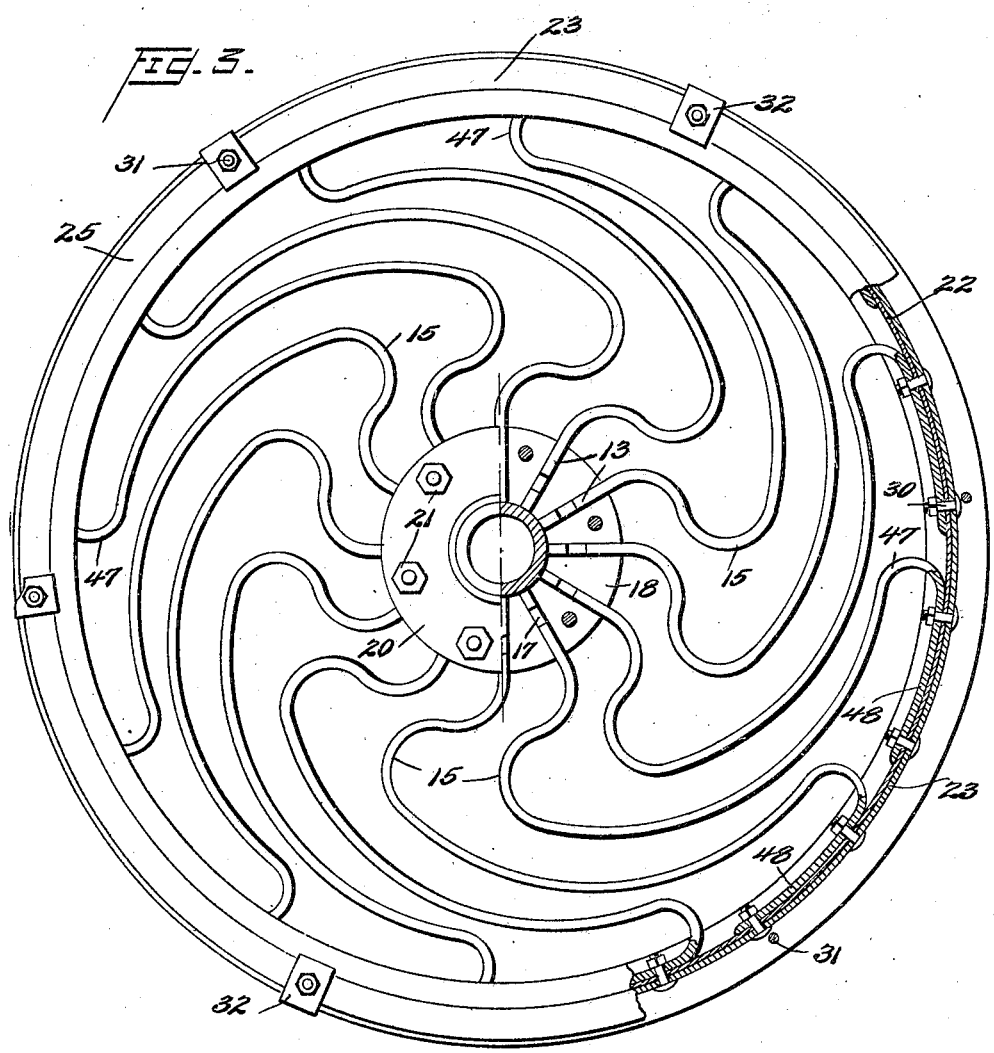
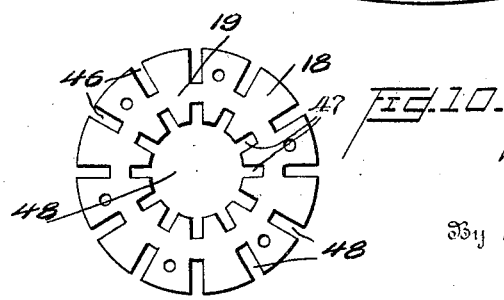

Dec. 26, 1922.
W. J. BEISEL.
SPRING WHEEL.
FILED DEC. 7, 1921.
1,440,128
3 SHEETS-SHEET 3
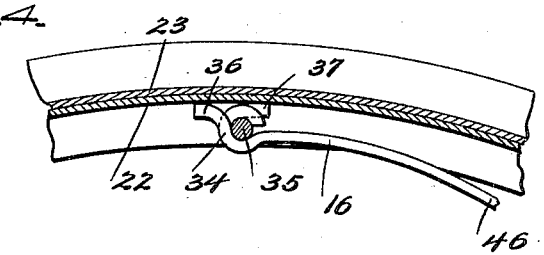
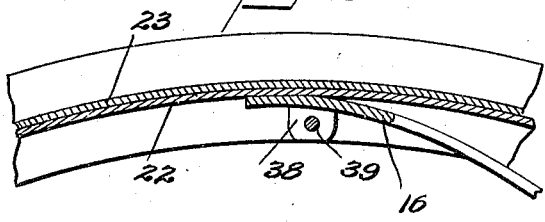
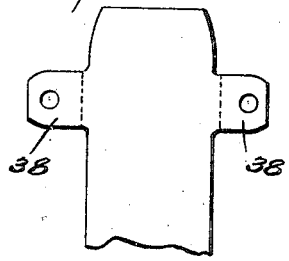
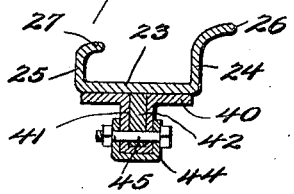
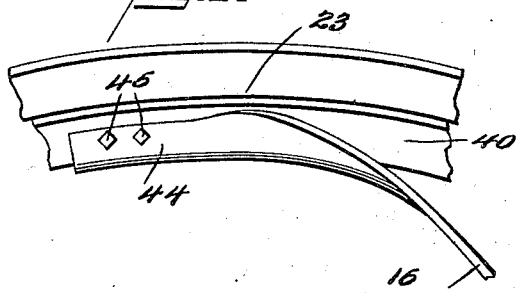
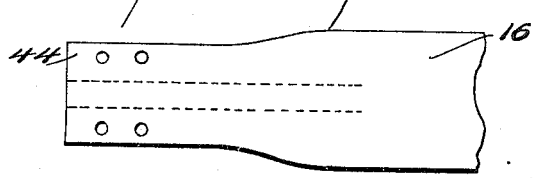
Inventor
William J. Beisel
By Watson, Colt, Morse & Grindle
Attorneys Patented Dec. 26, 1922.

1,440,128

UNITED STATES PATENT OFFICE.

WILLIAM JAKOB BEISEL, OF PORT RICHMOND, NEW YORK.

SPRING WHEEL.

Application filed December 7, 1921. Serial No. 520,575.

*To all whom it may concern:*

Be it known that I, WILLIAM J. BEISEL, a citizen of the United States, and residing at Port Richmond, county of Richmond, State of New York, have invented certain new and useful Improvements in Spring Wheels, of which the following is a specification.

This invention relates to spring wheels for vehicles and is especially adapted for use on motor vehicles. The particular embodiment of it shown includes features of the hub structure disclosed and claimed in my copending application, Serial No. 487,615 filed July 26, 1921, and features of the rim structure adapting it to receive a demountable rim set forth and claimed in another application filed concurrently herewith. The novelty in the present case resides principally in the longitudinal form of the spring spokes whereby each includes a radial portion at the hub and an outer end approaching the rim gradually on a curve of large radius and provided with two laterally curved portions in the plane of the wheel extending on opposite sides of the radial plane of the inner portion between said inner portion and said outer end portion. Its novel features and advantages will be fully understood from the following description and claims taken with the accompanying drawings:

In the drawings:

Figure 1 is a side view of a wheel embodying the invention the rim structure being shown partly in section and a portion of the hub cap being shown removed;

Figure 2 is a partial section on the line 2—2 of Figure 1;

Figure 3 is a view similar to Figure 1 showing a modified form of spoke;

Figure 4 is a detail section through a part of the rim showing a different form of means for securing the ends of the spokes to the rim;

Figure 5 is a similar view of another form which may be used;

Figure 6 is a plan view of the end of the spoke in blank form shown in combination in Figure 5;

Figure 7 is a cross section showing another form of inner rim and a modification of the outer end of the spoke to match the rim;

Figure 8 is a side view of a portion of the wheel rim showing the modified structure of Figure 7;

Figure 9 is a plan view of the blank form of the end of a spoke used in the modification shown in Figure 7; and Figure 10 is a side view of one of the hub disks.

As shown in Figures 1 and 2 of the drawings the hub 10 has an integral radial flange 11 near one end and the other end 12 up to that flange is cylindrical. The spokes are made of flat spring metal of uniform width and of substantially uniform thickness and are all alike and symmetrically arranged whatever number is used. Their inner ends 13 are straight and radial entering the hub structure but have laterally curved portions between said radial hub portions and their outer ends.

The inner radial ends of the spokes have rectangular side notches 17. A pair of circular disks 18 having central openings 48 fitting the cylindrical portion 12 of the hub have radial slots 46 and 47 in their outer and inner edges corresponding in width to the thickness of the spokes with a solid portion 19 between the ends of the slots of such size as to fit in the rectangular notches 17 of the spokes with the adjacent edges of the spokes resting in the radial slots. A flange or circular disk 20 slides over the end of cylindrical portion 12 and fits the sides of the spokes and one of the disks 18 while the other sides of the spokes and the other disk 18 fit integral flange 11. Bolts with nuts 21 pass through the flanges and disks between spokes and secure them together on the hub.

The preferred form of rim structure and cooperating end structure of the spokes are shown in Figures 1 and 2. The inner rim 22 is channel shaped facing inward and is continuous constituting a channel bar rim. An outer channel shaped rim 23 facing outwardly and slightly wider than rim 22 fits the outer surface of rim 22 and has its inner flange 24 of greater height than its outer flange 25 and its outer edge is transversely curved outwardly as shown at 26. The outer edge 27 of flange 25 is transversely curved similarly to the outer edge 26. The outer ends 16 of the spokes are slightly curved outwardly or offset at 28 and from that point on to their extreme ends they have portions 29 closely fitting in and in contact with the base portion of the channel rim between its side flanges and the side flanges furnish lateral support. Bolts 30 or other suitable fastening means pass through the end portions 29 of the spokes the base of channel rim 22 and the base of channel rim 23 and securely hold them together. Bolts 31 having screw thread nuts pass through the side flanges 24 and 25 of channel rim 23 and also through retaining clips 32 which have a depending portion adapted to fit the outer and under side of flange 25 and an upper inwardly curved portion 33 above the outer edge of flange 25. The flange 25 being lower than flange 24 a demountable rim carrying a tire may, when clips 32 are turned out of the way on bolts 31 pass over that flange and make contact with the curved portion 26 of flange 24. The clips 32 may then be turned back to operative position and bolts 31 tightened to securely hold the detachable rim and tire in position.

Although the means shown in Figures 1 and 2 constitute the preferred form of connection between the ends of the spokes and the channel rim, other means may be used in combination with the two channel rims the outer of which serves to receive a detachable rim. In Figure 4 for instance is shown a form of connection where a part of the end of the outer portion 16 of the spoke is curled transversely in cylindrical form 34 surrounding a bolt 35 passing through the side flanges of the inner channel rim 22 thus securing the spoke to the rim. In this case projecting portions 36 and 37 make contact with the inner surface of the base of channel rim 22 so as to prevent rattling. In Figure 5 another form is shown where the end of portion 16 of the spoke is provided with perforated side ears 38 which are bent at right angles and a bolt 39 passes through them and through the side flanges of inner channel rim 22, the projecting end of the spoke bearing against the inner face of the base of the channel.

In Figures 7, 8, and 9, I have shown a modified form of inner channel bar rim and a modified form of spoke end to fit it and have also shown an added element in the form of a continuous ring interposed between the two channel bar rims. In this instance the inner rim 40 has a narrow channel 41 facing outwardly and laterally extending portions in the form of a cylinder with the center of the hub as its axis lying flat against the inner surface of the outer channel rim 23. The outer channel rim 23 and its means for receiving and retaining a detachable rim are the same as heretofore described and shown in Figures 1 and 2. A solid continuous ring 42 fills the channel in rim 40. In this instance the side portions of the spoke are cut away at the end from the point 43 in Figure 8, and the projecting narrow portion 44 is bent transversely on longitudinal dotted lines to right angles and fits over the inward projection formed by the narrow channel 41 of rim 40. This lateral bending of the narrow portion of the spoke extends somewhat beyond the point 43 but the wider portions of the spoke are gradually bent outward lessening the central longitudinal depression and bringing all parts of the spoke into transverse alignment or into the same transverse plane near the rim. Bolts 45 pass through the lapping sides of portion 44 the walls of channel 41 and ring 42 thereby rigidly securing the ends of the spokes to the inner rim and ring 42. It will be noted that in this form as well as that of Figures 1 and 2 the outer ends of the spokes closely fit the inner portions of the inner channel bar rim and are rigidly bolted to it.

It will be observed that in the form shown in Figures 1 and 2 each flat leaf spring spoke is curved laterally of the plane of its inner radial end 13 at 14 and then back across that plane forming a laterally projecting portion 15 and after it has passed a material distance beyond that plane it is reversely curved back across the plane forming a curved projecting portion 46 on that side of the plane. Beyond said second projecting portion the curvature is on a gradually increasing radius until the outer end 16 approaches the inner face of the inner rim at substantially a tangent and is secured to the rim by the means heretofore described.

The structure shown in Figure 3 like that shown in Figure 1 includes the two reversely curved portions between the ends of the spokes but differs in the relative location of the outer curved projecting portion beyond the inner curved portion 15. In this instance the outer curved portion 47 is out near the end of the portion 16 where the radius of curvature has increased greatly and it is on a shorter radius than curve 15 and terminates in the portion 48 extending along and fitting the inwardly facing surface of the inner channel bar rim 22 and is secured thereto by bolts 30 as heretofore described. It will be noted that the two portions curved in opposite directions between the ends of the spokes cause four different portions of the spokes to extend across the lines or planes of pressure in sustaining a load and this adds greatly to their yielding effect and avoids jars and shocks in passing over obstructions or rough places.

Although a wheel having twelve spokes each composed of a single strip of metal is shown for illustration the invention is not limited as to the number of spokes or the number of layers of which they are composed and is not limited to any of the details shown beyond what is indicated in the claims.

Having thus described the invention what I claim as new and desire to secure by Letters Patent is:

1. A spring wheel comprising a hub, a rim, a series of spring metal spokes secured at their inner ends to the hub each embodying two portions between its ends curved laterally of a radial plane passing through its inner end in opposite directions and an outer end portion having a radius of curvature much greater than that of the portions mentioned making contact with and secured to the rim materially beyond the radial planes through their inner ends.

2. A spring wheel comprising a hub, a rim, a series of spring metal spokes of greater width than thickness with their transverse surfaces on lines parallel to the axis of the hub and rim, secured to the hub in radial planes at their inner ends and each embodying two longitudinally spaced oppositely projecting portions laterally curved in reference to said radial planes and an outer end approaching said rim gradually on a much larger radius of curvature, and means for securing said outer ends to said rim the distance from the innermost curve to the rim being more than two-thirds of the diameter of the inner surface of the rim.

3. A spring wheel comprising a hub, a rim, a series of spring metal spokes of greater width than thickness with their transverse surfaces on lines parallel to the axis of the hub and rim, secured to the hub in radial planes at their inner ends and each embodying two longitudinally spaced oppositely projecting portions laterally curved in reference to said radial planes and an outer end approaching the rim gradually on a much greater radius of curvature, said rim being in the form of an inwardly facing channel bar and the ends of the spokes entering said channel at points materially beyond the radial plane of their inner ends and fitting between its side flanges and means for bolting said ends in said channel bar rim.

4. A spring wheel comprising a hub, a series of spring metal spokes the inner ends of which are in radial planes and secured to the hub each spoke having two curved portions projecting laterally on opposite sides of the radial plane of its inner end, and a portion extending across and materially beyond the radial plane of the inner end on a curve of large radius with its extreme end portion in the arc of a circle having the axis of the hub as its center, a channel shaped rim facing inwardly with the inner face of its base in contact with the ends of the spokes and its side flanges lapping their sides and bolts securing said ends to said rim.

In testimony whereof I hereunto affix my signature.

WILLIAM JAKOB BEISEL.